United States Patent [19]

Pierce

[11] Patent Number: 5,129,870
[45] Date of Patent: Jul. 14, 1992

[54] MULTIPLE-RATIO AUTOMATIC TRANSMISSION WITH RELEASABLE HYPERBOLOIDAL COUPLINGS

[75] Inventor: Stanley L. Pierce, Northville, Mich.

[73] Assignee: Ford Motor Company, Dearborn, Mich.

[21] Appl. No.: 812,646

[22] Filed: Dec. 23, 1991

[51] Int. Cl.$^5$ .......................... F16H 1/46; F16D 41/08
[52] U.S. Cl. .................................. 475/285; 475/278; 192/47; 192/48.92; 192/12 B; 188/82.3; 188/82.84
[58] Field of Search ................... 192/45, 47, 48.92, 65, 192/12 B; 475/271, 272, 275, 276, 277, 284, 285, 288, 289, 294; 188/82.2, 82.3, 82.84

[56] References Cited

U.S. PATENT DOCUMENTS

| | | | |
|---|---|---|---|
| 1,670,197 | 5/1928 | Humfrey | 192/45 |
| 1,929,782 | 10/1933 | Hughes | 192/48.92 |
| 2,076,635 | 4/1937 | Halstead | 192/47 |
| 2,113,512 | 4/1938 | Kesterton | 192/47 |
| 3,557,921 | 1/1971 | Takada | 192/45 |
| 4,123,952 | 11/1978 | Wayman | 475/285 X |
| 4,284,183 | 8/1981 | Brisabois et al. | 192/47 X |
| 4,805,718 | 2/1989 | Iwata et al. | 192/48.92 X |
| 4,978,328 | 12/1990 | Pierce | 475/66 |
| 5,031,746 | 7/1991 | Koivunen | 192/85 AA |
| 5,067,601 | 11/1991 | Castens | 192/63 |

FOREIGN PATENT DOCUMENTS

| | | |
|---|---|---|
| 0190017 | 1/1986 | European Pat. Off. . |
| 89/03941 | 5/1989 | PCT Int'l Appl. . |
| 452700 | 3/1973 | U.S.S.R. . |
| 131309 | 11/1920 | United Kingdom ........ 192/47 |

Primary Examiner—Richard Lorence
Assistant Examiner—Khoi Q. Ta
Attorney, Agent, or Firm—Frank G. McKenzie; Roger L. May

[57] ABSTRACT

An automatic transmission having multiple planetary gear elements adapted to establish and disestablish plural torque delivery paths between a driving member and a driven member, and releasable couplings adapted to connect selected gear elements of the transmission to ground and to connect two of the elements together to effect nonsynchronous ratio changes in the transmission without the necessity of engaging and releasing in timed sequence friction clutches and friction brakes, whereby friction torque losses are reduced and ratio changes in the transmission have a high degree of smoothness.

11 Claims, 5 Drawing Sheets

| Gear | Range | CL1 | CL2 | CL3 | CL4 | OWC | 3-Way HYBO 1 * | 3-Way HYBO 1 DR | 3-Way HYBO 1 CST | 2-Way HYBO 2 * | 2-Way HYBO 2 DR | 2-Way HYBO 2 CST | 4-Way HYBO 3 * | 4-Way HYBO 3 DR | 4-Way HYBO 3 CST |
|---|---|---|---|---|---|---|---|---|---|---|---|---|---|---|---|
| 1" | Low | X | | | | ✓ | N | | | N | | | ↓ | ✓ | O/R |
| 1' | Low | X | | | | ✓ | ↓ | O | O | N | | | ↓ | ✓ | O/R |
| 1 | Low | | X | | | ✓ | ↓ | ✓ | O/R | N | | | ↓ | ✓ | O/R |
| 2 | Low | | X | X | | ✓ | ↓ | O/R | O/R | N | | | ↓ | ✓ | O/R |
| 3" | Low | X | X | | | ✓ | ↓ | O | O | N | | | ↓ | O/R | O/R |
| 3' | Low | X | X | | | ✓ | ↓ | ✓ | O/R | N | | | ↓ | O/R | O/R |
| 3 | Low | | X | X | | ✓ | ↓ | O/R | O/R | N | | | ↓ | O/R | O/R |
| 4 | Hi | | X | X | X | O/R | | | | N | | | ↑ | O | O |
| 5 | Hi | | X | | X | O/R | | | | ↑ | O | O/R | ↑ | O | O |
| N | Low | | | | | O | ↓ | | | N | | | N | | |
| R' | Low | X | | | | ✓ | ↓ | O | O | N | | | N | | |
| R | Low | | X | | | ✓ | ↓ | ✓ | O | N | | | ↑ | O | O |
| M1' | Hi | | | X | | O/R | | | | N | | | ↑ | ✓ | ✓ |
| M1 | Hi | X | | X | | O/R | | | | N | | | ↑ | O | O |
| M2' | Hi | | | X | X | O/R | | | | N | | | ↑ | ✓ | ✓ |
| M2 | Hi | | X | X | X | O/R | | | | N | | | ↑ | O | O |
| M3 | Hi | X | X | | X | O/R | ↓ | O | O | N | | | ↓ | O/R | O/R |

→ – Forward Drive Direction
✓ – Load Carrying
X – Applied
O/R – Over Running
N – Neutralized "or" – Means Transient Condition of Required Sequence
O – No Load, No Relative Motion
* – Locking Direction Of Inner Member Relative To Outer

MULTIPLE-RATIO AUTOMATIC TRANSMISSION WITH RELEASABLE HYPERBOLOIDAL COUPLINGS

TECHNICAL FIELD

My invention relates to automotive power transmission mechanisms wherein multiple forward driving torque delivery paths and at least a single reverse torque delivery path is established by gearing as selectively releasable and engageable couplings are used to control the relative motion of gear elements of the transmission and to control selectively the distribution of torque to a reaction point.

BACKGROUND OF THE INVENTION

My invention comprises improvements in a planetary multiple-ratio transmission of the kind shown, for example, in my U.S. Pat. No. 4,978,328, issued Dec. 18, 1990, which is assigned to the assignee of my present invention.

The transmission described in that patent includes a hydrokinetic torque converter located on the axis of the crankshaft of an internal combustion engine. An output shaft is arranged in spaced parallel disposition with respect to the engine crankshaft axis. A plurality of simple planetary gear units is disposed on the output shaft axis, the torque output element of the planetary gear units being connected drivably to a final drive which, in turn, distributes torque to the input element of a geared differential.

The output shaft is connected to one output side gear of the differential and extends through the planetary gearing. It is adapted to be connected to a vehicle traction wheel through a universal coupling. A second traction wheel is connected to a companion output shaft connected to a second output side gear of the differential.

Torque is distributed from a turbine member of the hydrokinetic torque converter through a torque transfer drive to the input elements of the planetary gearing.

Friction clutches and brakes are used to establish reaction points in the planetary gearing and to connect one element of the gearing to a companion element as the planetary gearing is conditioned for multiple forward driving ratios and a reverse ratio. A low-speed ratio is achieved by connecting a turbine-driven torque input shaft to a torque input element of the gearing through a friction clutch and an overrunning coupling acting in series relationship in the torque flow path.

The reaction element during low-speed ratio operation is a friction brake. The friction brake used for low-speed ratio operation remains applied during a ratio change to the second ratio as a second friction clutch is applied. The overrunning coupling associated with the first ratio then freewheels.

During direct-drive operation, a second, direct-drive friction clutch is applied as the first friction clutch remains applied, thus connecting the elements of the gearing together for rotation in unison. The direct-drive friction clutch is arranged in series relationship in the torque flow path that distributes torque to one of the input elements of the gearing.

Overdrive operation requires the application of another friction brake, and reverse drive operation requires engagement of a third friction brake.

GENERAL DESCRIPTION OF THE INVENTION

The improvements of my invention make it possible to substantially simplify the clutch and brake arrangements in a gear system of the kind disclosed in my '328 patent and to thereby improve the transmission efficiency and reduce the cost and weight, as well as the overall dimensions of the engine and transmission powertrain package. These objectives are achieved by reducing significantly the clutch and brake complexity and eliminating substantially all of the friction elements, such as the brake elements.

The reaction torque flow paths for the gear elements and the clutching functions for the gear elements are achieved by bi-directional, one-way couplings. The bi-directional feature of the couplings allows the transmission designer to provide multiple ratios with substantially fewer parts compared to conventional planetary transmissions.

The multiple functions of the overrunning couplings and the friction brakes in a transmission of the kind disclosed in my '328 patent can be achieved in my improved design by releasable couplings that are capable of transferring torque in a driving direction or in a coast direction, or in both the coast and drive directions. The couplings are capable also of permitting freewheeling motion in either the driving direction or the coast direction. The operating mode of the clutches can be controlled depending upon whether torque delivery in the driving direction or in the coast direction is required for the particular ratio that is desired and whether freewheeling motion is desired. It is possible to achieve synchronous ratio changes that do not require the application and release in timed relationship of friction clutches and brakes, as in the case of prior art designs.

When a releasable coupling or latching device is used to replace a friction reaction brake, friction drag normally associated with the friction reaction brake is eliminated while the vehicle is in motion, thereby improving the mechanical efficiency and fuel economy of the driveline. Such latching devices include cooperating inner and outer coupling races that can be engaged or released regardless of the relative positions of the races. Pre-engagement indexing of one race with respect to the other is not required. Thus, there is no possibility of a coupling "block-out" as is common in the case of couplings such as conventional transmission synchronizer clutches which require the mating of clutch teeth on one clutching element with a cooperating tooth space in the companion clutch element during clutch engagement.

A releasable clutch adapted to function in this fashion may comprise inner and outer races which are generated about an axis common to both the inner and outer races and wherein roller clutch elements are disposed between the races. The axis of the roller clutch elements is skewed with respect to the common axis. For all practical purposes, each roller element can be deemed to be a generator element that defines the inner and outer surface profiles of the clutch races, the surface profiles defining a hyperboloidal surface of revolution. As one race rotates relative to the other, the roller elements tend to rotate in the same direction about their own axes; but since the ends of the roller elements are situated at different radii, the ends do not move at the same rate in an angular direction. Therefore, the roller elements will lock in the direction of rotation of one race relative to the other in a driving direction, but they will permit freewheeling motion of the races when the races are moving in the opposite relative direction. Either a left-hand skew or a right-hand skew is effected depending upon the angular disposition of the axes of the rollers with respect to the common axis of the races.

A bi-directional coupling of this general type is described in European Patent Application No. 0190017, filed Aug. 6, 1986, by Romostar Corporation. Another earlier prior art teaching dealing with multidirectional clutches of this kind is U.S. Pat. 3,557,921, filed by Nobuo Takada on Mar. 25, 1969. Reference may be had to those prior art teachings for the purpose of supplementing my present disclosure.

According to a feature of my invention, I have incorporated in a planetary gear transmission clutches and brakes that are capable of establishing a locking action in either of two directions selectively and which are capable also of being released by simplified clutch actuators that will permit the bidirectional clutches to be disabled, thereby allowing freewheeling motion of the associated planetary elements in either direction.

When the actuators are activated, one race is shifted axially with respect to the other, thereby eliminating the locking action of the rollers situated between the races. Freewheeling motion of the associated gear elements of the gear system then may occur without an accompanying frictional drag that normally would be associated with such freewheeling motion in a transmission of the conventional kind wherein friction discs are used to establish a braking action or a clutching action for controlling relative motion of the gear elements or for controlling distribution of torque reaction from the gear elements to the transmission case.

PARTICULAR DESCRIPTION OF THE INVENTION

Figure 1:
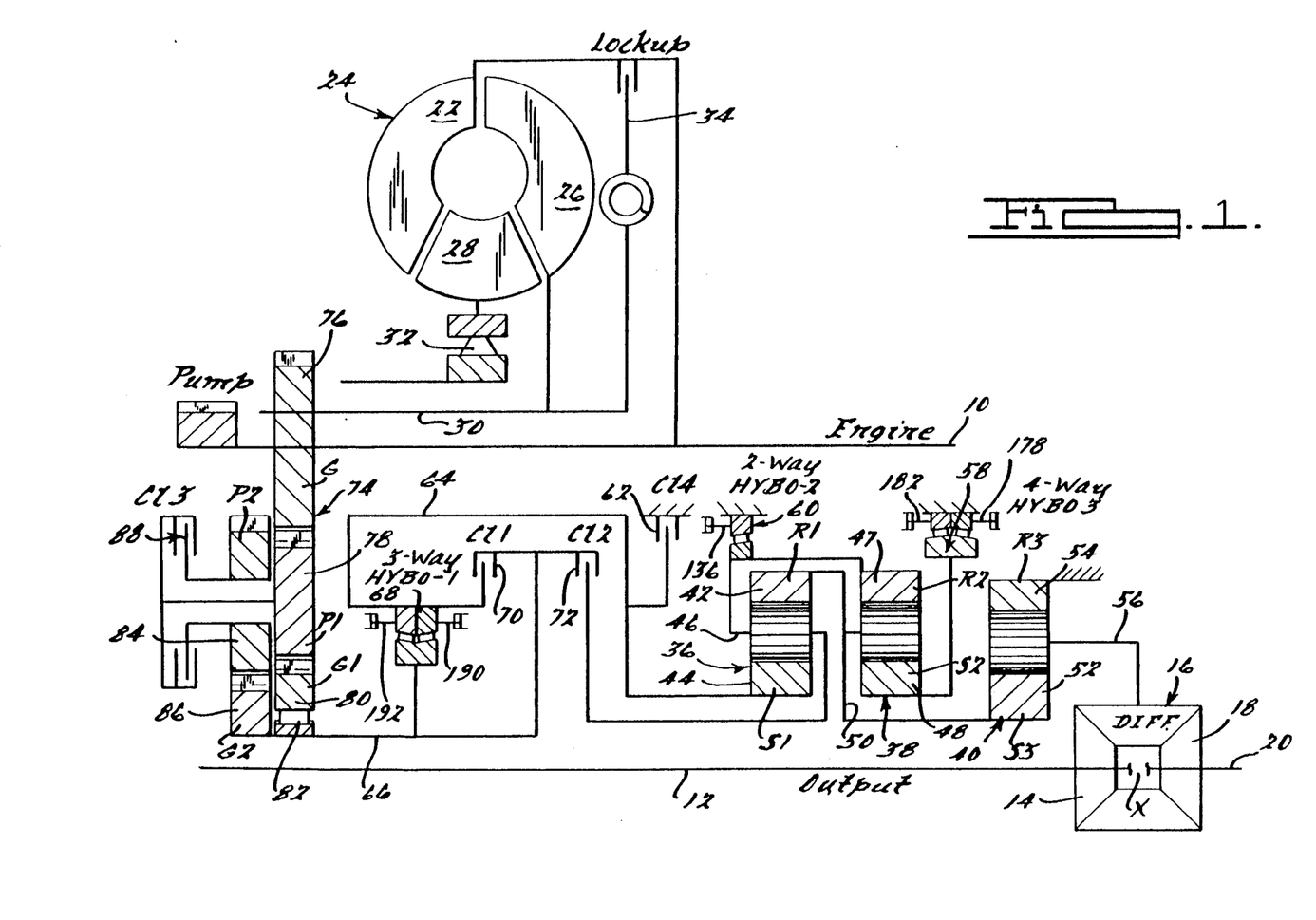
FIG. 1 shows a schematic diagram of a planetary transmission incorporating the improvements of my invention.

FIG. 1 shows in schematic form a transmission adapted to deliver torque from an internal combustion engine to vehicle traction wheels. The centerline for the crankshaft of the engine is shown at 10. The output shaft 12 extends to one traction wheel (not shown), one end of the shaft 12 being connected to side gear 14 of an output differential gear unit 16. Another side gear 18 of the differential gear unit 16 is connected to a companion torque output shaft 20, which is connected drivably to a second vehicle traction wheel.

Crankshaft 10 is connected drivably to impeller 22 of hydrokinetic torque converter 24. Turbine 26 of converter 24 is arranged with impeller 22 and a bladed stator 28 in a closed toroidal fluid flow circuit in known fashion. Turbine torque developed by converter 24 is distributed to turbine shaft 30, which extends in spaced parallel disposition with respect to the output shaft 12.

An overrunning stator brake 32 provides torque reaction for converter 24 and prevents rotary motion of the bladed impeller 28 in a direction opposite to the direction of rotation of the impeller 22, although freewheeling motion in the direction of rotation of the impeller 22 is permitted during the coupling phase of the converter 24. If desired, a torque converter bypass clutch or lockup clutch may be used to connect drivably the impeller 22 with the turbine 26 as shown at 34.

The transmission mechanism comprises a first simple planetary gear unit 36, a second simple planetary gear unit 38 and a final drive planetary gear unit 40. They are mounted about a common axis corresponding to the axis of output shaft 12.

Gear unit 36 comprises a ring gear 42, a sun gear 44 and a carrier 46, the latter carrying pinions that engage ring gear 42 and sun gear 44. Similarly, gear unit 38 comprises a ring gear 47, sun gear 48 and a carrier 50, the latter journalling pinions that engage ring gear 46 and sun gear 48.

Carrier 50 is connected drivably to ring gear 42. Carrier 50 also is connected to sun gear 52 of gear unit 40. Ring gear 54 of gear unit 40 is held stationary against the transmission housing. Carrier 56 for gear unit 40 journals pinions that mesh with sun gear 52 and ring gear 54. It is connected drivably to the carrier of the differential gear unit 16.

Sun gear 48 is adapted to be braked by a releasable coupling identified by reference numeral 58. As will be explained subsequently, the coupling 58 is adapted to deliver a reaction torque from the sun gear 48 to the transmission housing in a forward driving direction during operation in the first and second speed ratios. During operation in the manual low-speed ratio condition, it is adapted to anchor the sun gear against the housing to prevent rotation in either direction.

Carrier 46 for the gear unit 36, as well as the ring gear 47, can be braked by releasable coupling 60 during operation in reverse in the forward-drive direction, although it is capable of freewheeling during coast in reverse.

Sun gear 44 of the gear unit 36 is adapted to be braked by friction brake 62 during overdrive operation, as will be explained subsequently. The sun gear is connected also to the torque transfer member 64, which is adapted to be connected to torque input shaft 66 by a third releasable compound coupling identified generally by reference character 68.

The coupling 68 is locked for delivery of torque from shaft 66 to member 64 during low-speed ratio operation in the driving condition, but it may overrun in the low-speed ratio during coast drive. The same is true during operation in the third and fourth speed ratios, although it is conditioned at that time for torque delivery in the opposite direction as will be explained subsequently.

The coupling 68 is arranged in series relationship with respect to friction clutch 70, which selectively connects input shaft 66 with the torque transfer member 64 during second-speed ratio operation, as will be explained. A second friction clutch 72 is adapted to connect selectively the torque input shaft 66 to the carrier 46 during operation in the second, third, fourth and fifth speed ratio.

Torque is transferred from the turbine 26 to the input shaft 66 through a two-speed geared torque transfer mechanism identified generally by reference numeral 74. This torque transfer mechanism comprises a drive gear 76 connected to the turbine shaft 30. It engages drivably an idler gear 78, which meshes directly with driven gear 80, the latter being connected to input shaft 66 through an overrunning clutch 82. A second torque flow path through the torque transfer gear mechanism 74 comprises idler gear 84, which meshes with driven gear 86. Idler gear 84 is adapted to be connected to idler gear 78 through a selectively engageable friction clutch 88. When the clutch is engaged, the overrunning coupling 82 freewheels. When the clutch is disengaged, torque is transferred directly from turbine shaft 30 through gears 76, 78 and 80 and through the overrunning clutch 82 to the shaft 66.

Coupling 68 is identified in FIG. 1 by the legend Hybo-1, coupling 60 is identified by the legend Hybo-2, and coupling 58 is identified by the legend Hybo-3. Couplings Hybo-1 and Hybo-3 are double-acting couplings, and coupling Hybo-2 is a single-acting coupling, i.e., Hybo-2 can deliver torque in one direction only, but coupling Hybo-1 and coupling Hybo-3 can deliver torque in either direction depending upon the operating mode that is chosen.

For the purpose of understanding the mode of operation of the couplings identified as Hybo-1, Hybo-2 and Hybo-3, reference will now be made to the schematic diagrams of FIGS. 6 and 7.

Figure 6:
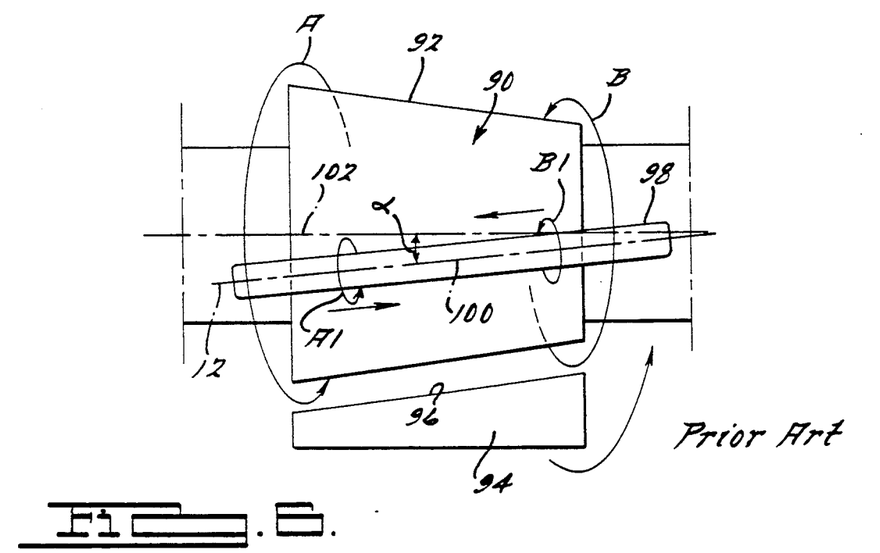
FIG. 6 schematic view of a releasable one-way clutch having a hyperboidal inner race and a cooperating outer race with skewed roller elements disposed between the races.

In FIG. 6, numeral 90 designates the inner race of a releasable coupling. The race includes a surface 92 which may be a hyperboloidal surface. In some instances the hyperboloidal surface may be conical, as shown in FIG. 6, since a cone is a special case for a hyperbola. Surrounding the race 92 is an outer race 94 having an inner clutch surface 96 which is of a geometry similar to the geometry of the surface 92. Rollers 98 are situated in the space between the surfaces 92 and 96.

The axes 100 of the rollers 98 are skewed relative to the axes 102 of the inner and outer races. The skew angle between the axes is identified in FIG. 2 by the symbol $\alpha$ (alpha).

Figure 7:
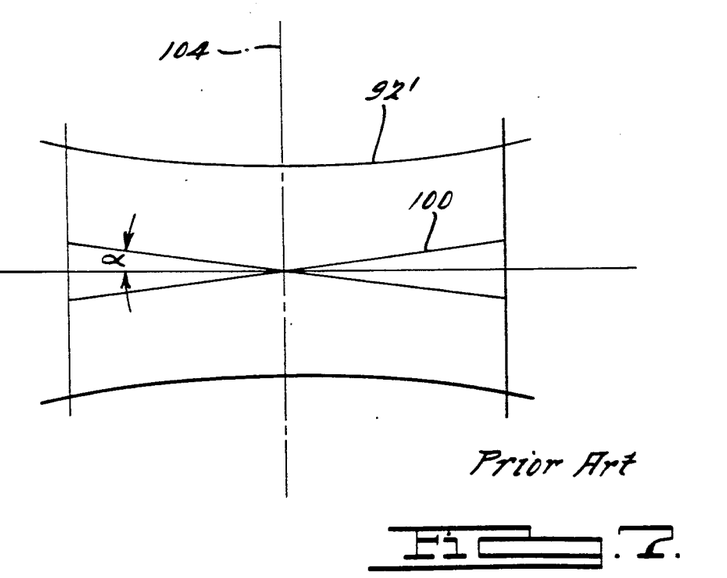
FIG. 7 shows the hyperbolic surface of revolution that is generated by a line corresponding to the axis of the rollers as shown in FIG. 1 as the line is rotated about the geometric axis of the races.

If it is assumed that the axis of the rollers is rotated about the axis 12, the surface of revolution that is formed is a hyperboloid, as indicated in FIG. 7 by the reference numeral 92'. The prior art representation of FIG. 7 simply illustrates the surface of revolution that would be generated by a generator line corresponding to the axis of the roller. The race of FIG. 6 would correspond to the portion of the hyperbolic surface on the left side of the geometric axis 104 located at a point of minimum radius for the hyperbolic surface 92'.

If it is assumed that race 94 moves relative to the race 90 in the direction of the arrow A in FIG. 6, the rollers will rotate in the same direction about their own axes as indicated by the arrow A1; but since the ends of the rollers 98 are operating at different radii, one with respect to the other, the ends of the rollers of greater radius will move faster, thus causing the rollers to skew. This tends to increase the angle of inclination of the rollers with respect to the plane passing through the axis 102. This will prevent relative rotation of the race 94 with respect to the race 90. On the other hand, if the race 94 moves in the direction of the arrow B, the rollers will move in the direction of arrow B1 out of clutching engagement with respect to the races, thereby allowing the race 94 to freewheel with respect to the race 90.

If the race 94 is moved to the right with respect to the race 90 as seen in FIG. 6, the space between the races will increase, thereby freeing the rollers so that the races may move in each direction, one with respect to the other. This corresponds to freewheeling motion in either direction.

Figure 3:
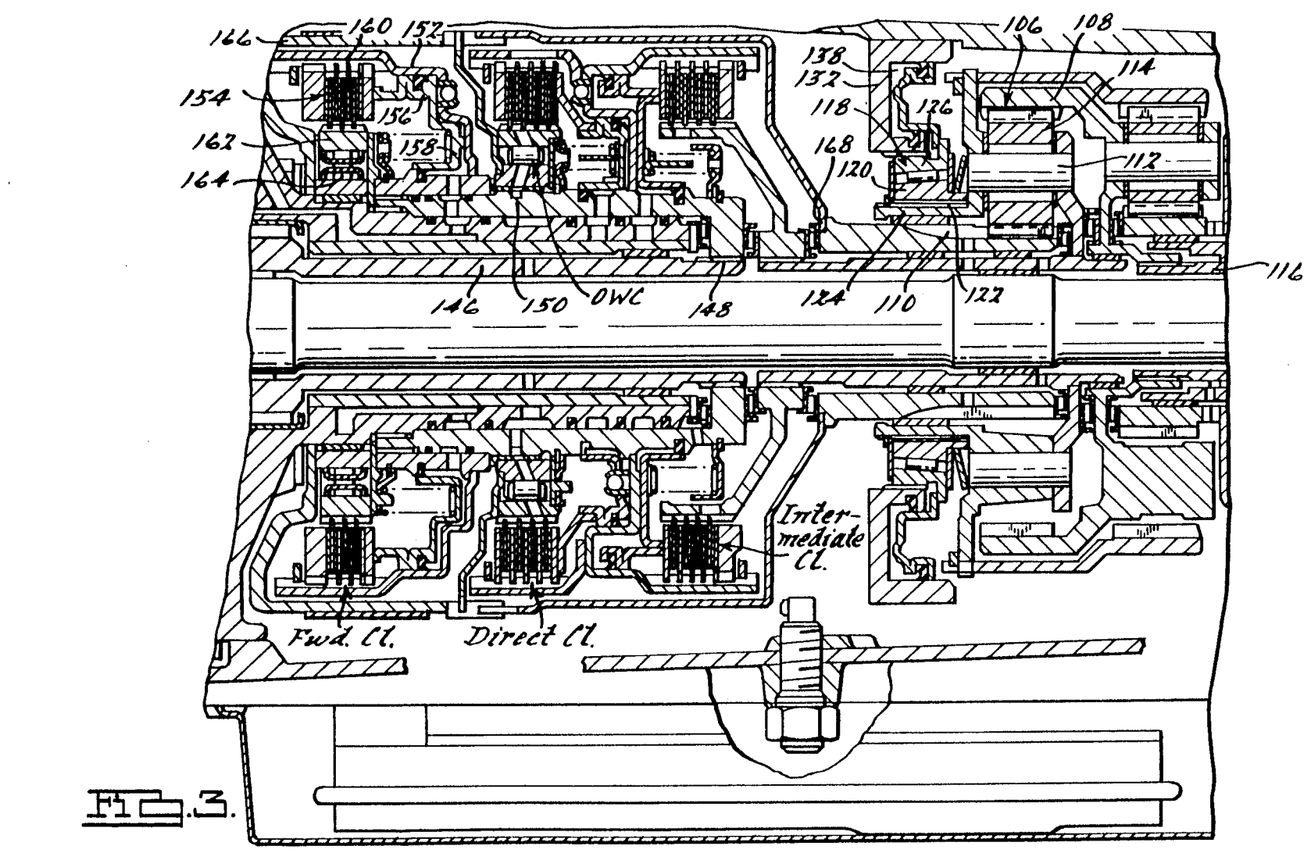
FIG. 3 is a partial cross-sectional view of a gear system and a clutch and brake arrangement wherein a multiple directional coupling is used in a transmission of the kind shown in my U.S. Pat. No. 4,978,328 for anchoring the carrier of the first planetary gear unit and the ring gear of the second planetary gear unit during reverse drive operation but which will permit relatively friction-free rotation of those gear elements spring forward-drive operation.
Figure 4:
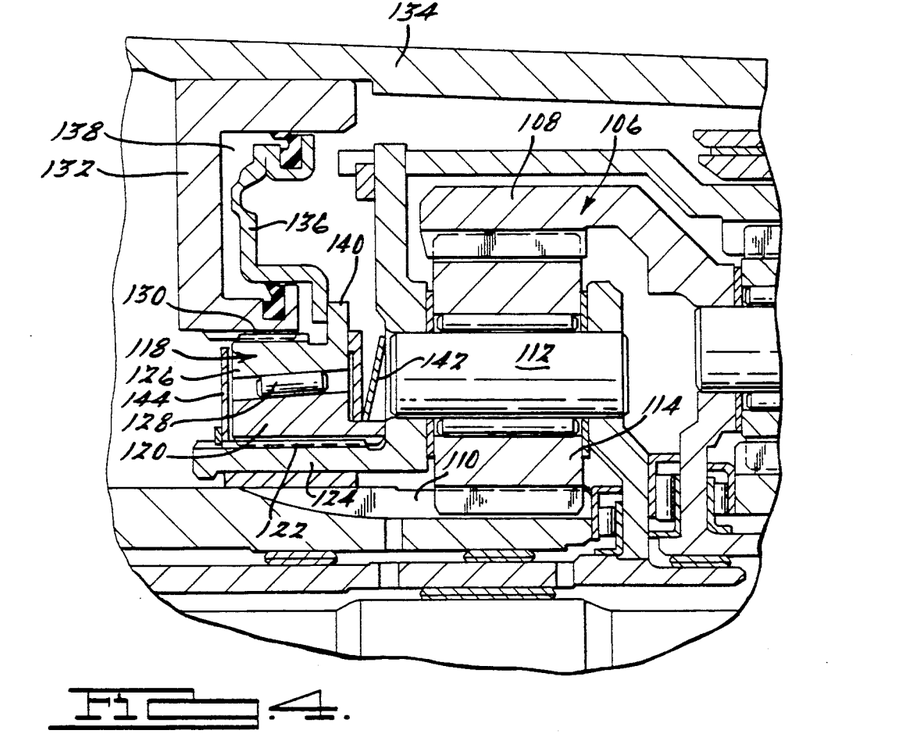
FIG. 4 is an enlarged view of the releasable coupling used in the gear system of FIG. 3.

In order to explain the mode of operation of my invention, I will refer now to FIGS. 3 and 4 which illustrate a gear system generally similar to the gear system shown in my U.S. Pat. No. 4,978,328. The gear system of FIGS. 3 and 4 includes a gear unit 106 which has a ring gear 108, a sun gear 110 and a carrier 112. Pinions 114 supported by the carrier 112 engage the ring gear 108 and the sun gear 110. Sun gear 108 is connected to torque output shaft 116.

A releasable coupling 118, which corresponds to the coupling 60 of the FIG. 1 embodiment, is adapted to anchor the carrier 112 during reverse drive. It includes an inner race 120, which is slideably splined at 122 on a sleeve 124 carried by the carrier 112. Outer race 126 surrounds the race 120 and is provided with a conical or hyperboidal inner clutch surface that corresponds to the clutch surface of the inner race 120. Rollers 128 are situated between the races in the manner described with reference to FIG. 8. The outer race 126 is slideably splined at 130 to a stationary cylinder 132 secured to the transmission case 134. Cylinder 132 receives an annular piston 136 which cooperates with the cylinder to define a pressure cavity 138.

Piston 136 engages actuator shoulder 140 carried by the outer race 126. When the chamber 138 is pressurized, piston 136 will shift the race 126 in a right-hand direction relative to the inner race 120, thereby causing the rollers to effect a locking action when the transmission is to be conditioned for reverse torque delivery so that carrier 112 may act as a reaction point as the reaction torque on the planetary gear unit 106 is transferred to the transmission case 134.

When pressure is relieved from the chamber 138, an annular Belleville washer spring 142 situated between the carrier 112 and the outer race 126 will shift the outer race 126 in a left-hand direction relative to the inner race 120, thereby unlocking the coupling 118.

The inner race 120 is held against axial shifting movement by a reaction washer 144, which is held fast on the sleeve 124 by a snap ring as indicated. It is apparent from FIG. 4 that when the coupling 118 is actuated by fluid pressure, torque may be transmitted in one direction from the carrier 112 to the transmission case to accommodate reverse drive. The torque reaction is capable of freewheeling in the opposite direction, however, because of the action of the skewed rollers 100 explained with reference to FIGS. 6 and 7. On the other hand, when the pressure is relieved, the coupling 118 becomes unlocked as the race is shifted into a left-hand direction relative to the inner race 120 so that freewheeling motion in each direction is achieved.

The torque input shaft for the gearing system shown in FIGS. 3 and 4 is the sleeve shaft 146. Shaft 146 is connected drivably at 148 to sleeve 150, which in turn is connected to cylinder 152 of friction clutch 154. Cylinder 152 receives annular piston 156 which cooperates with the cylinder 152 to define a pressure chamber 158. When the chamber is pressurized, friction discs 160 of the clutch 154 are engaged, thereby allowing input torque to be distributed to the outer race 162 of overrunning coupling 164. Reverse drive torque is thus delivered from the input shaft and through the clutch 160, then through the overrunning coupling 164 to the inner race which in turn drives torque transfer member 166 which is connected at 168 to sun gear 110. With the carrier 112 being anchored by the coupling 118, the sun gear 110 will drive the ring gear 108 in a reverse direction which results in the delivery of reverse driving torque to the output shaft 116.

During forward drive operation, when driving torque in a forward driving direction is delivered to sun gear 110, the carrier 112 will be driven in a forward driving direction. This occurs because of the overrunning action achieved by the coupling 118. Unlike the arrangement shown in U.S. Pat. No. 4,978,328, this forward driving action can occur without relative motion between friction elements for a friction brake. When reverse drive is not required, the coupling 118 can be neutralized as the spring 142 shifts the races to deactivate the clutch rollers 128. The coupling 118 then will be incapable of delivering torque in either direction.

The other elements of the FIG. 3 gearing function in the manner described in U.S. Pat. No. 4,978,328 and need not be repeated here since that description is not necessary to understand the mode of operation of the coupling 118.

Coupling 58 is a double-acting coupling which is capable of anchoring sun gear 48 against rotation in either direction, selectively. It is capable also of permitting freewheeling motion in one direction or the other and is capable of allowing freewheeling motion of the sun gear 48 in both directions.

Figure 5:
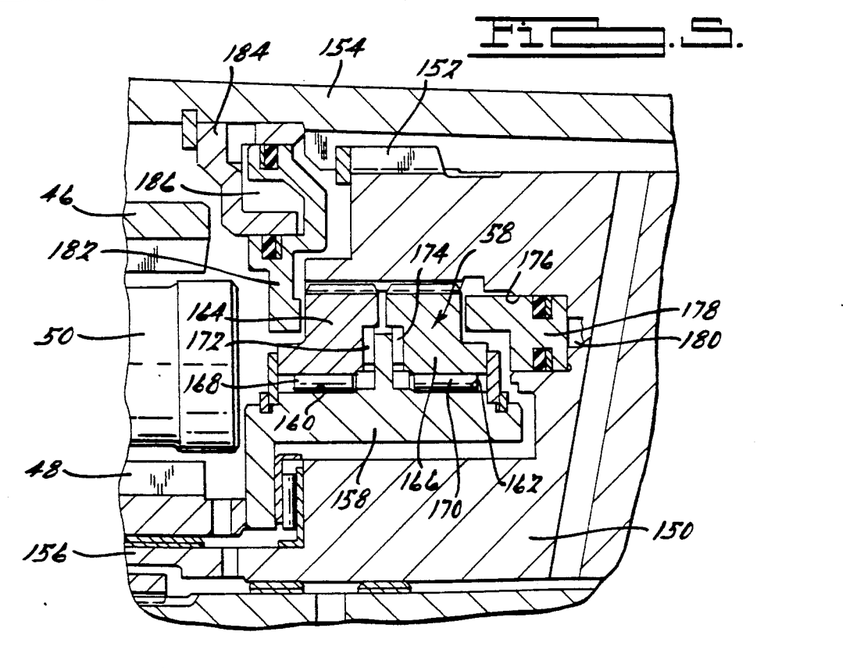
FIG. 5 is a cross-sectional view of a compound multiple-directional coupling used in a gear system such as that shown in Figure and illustrated schematically in FIG. 1 whereby the sun gear of the second planetary gear unit is capable of being anchored in either the forward driving direction or a coast drive direction, or being anchored against rotation in either direction or freewheeling in either direction depending upon the operating mode that is commanded by the co system for the transmission.

For a better understanding of the mode of operation of the clutch 58, reference now will be made to FIG. 5. A stationary housing is shown in FIG. 5 at 150. This is connected by means of a spline or key 152 to the transmission housing 154. Sun gear 48 is journalled on sleeve shaft 156 which forms a part of the housing 150. An inner race 158 is provided with two external hyperboidal surfaces 160 and 162.

A pair of outer races 164 and 166 surround the surfaces 160 and 162, respectively. These are formed with internal hyperboloidal surfaces corresponding to the external hyperboloidal surfaces 160 and 162. Rollers 168 and 170 are disposed in the spaces between inner race 158 and each of the races 164 and 166, respectively. A spring element in the form of an annular spring washer 172 is disposed between outer race 164 and inner race 158 as indicated. A similar annular spring washer 174 is disposed between the outer race 166 and the inner race 158. Each of these springs tends to move its respective outer race in a direction that tends to increase the spacing between the races occupied by its respective clutch rollers. This normally tends to neutralize the clutching action of the rollers.

An annular cylinder 176 is formed in the housing 150 and receives an annular piston 178. The piston 178 and the cylinder 176 cooperate to define a pressure chamber which communicates with a feed passage 180 in the housing 150. When the passage 180 is pressurized, piston 178 engages the outer race 166 and activates the clutch rollers 180 so that they are capable of delivering torque in one direction between the races 166 and 158. Similarly, race 164 can be shifted against the opposing force of spring 172, the latter tending normally to neutralize the clutch rollers 168. An annular piston 182 cooperates with cylinder member 184 secured to transmission housing 154. Cylinder member 184 is held fast to the housing and cooperates with the piston 182 to define a pressure cavity 186. When the cavity 186 is pressurized, piston 182 engages race 164 and shifts it into locking position so that the rollers 168 are activated, thereby conditioning the rollers 168 to transfer torque between the races 158 and 164 in one direction, although freewheeling motion in the opposite direction is permitted. When pressure is relieved from the chamber 186, spring 172 neutralizes the rollers 168. This action is similar to the action that was explained with reference to the prior art structure of FIG. 6.

In FIG. 1, I have shown also in schematic fashion actuators for the releasable coupling 68 which corresponds to the releasable coupling 58. The actuators for coupling 68 corresponding to pistons 178 and 182 for coupling 58 have been illustrated schematically in FIG. 1 by reference numerals 190 and 192, respectively. The coupling 68 operates in the manner described with reference to the coupling 58. It is capable of transferring torque between the shaft 66 and element 64 in one direction or in the other direction while permitting freewheeling motion in the opposite sense. When the torque reaction direction is reversed, it is capable also of permitting freewheeling motion between the shaft 66 and the element 64 in each direction.

Figure 2:
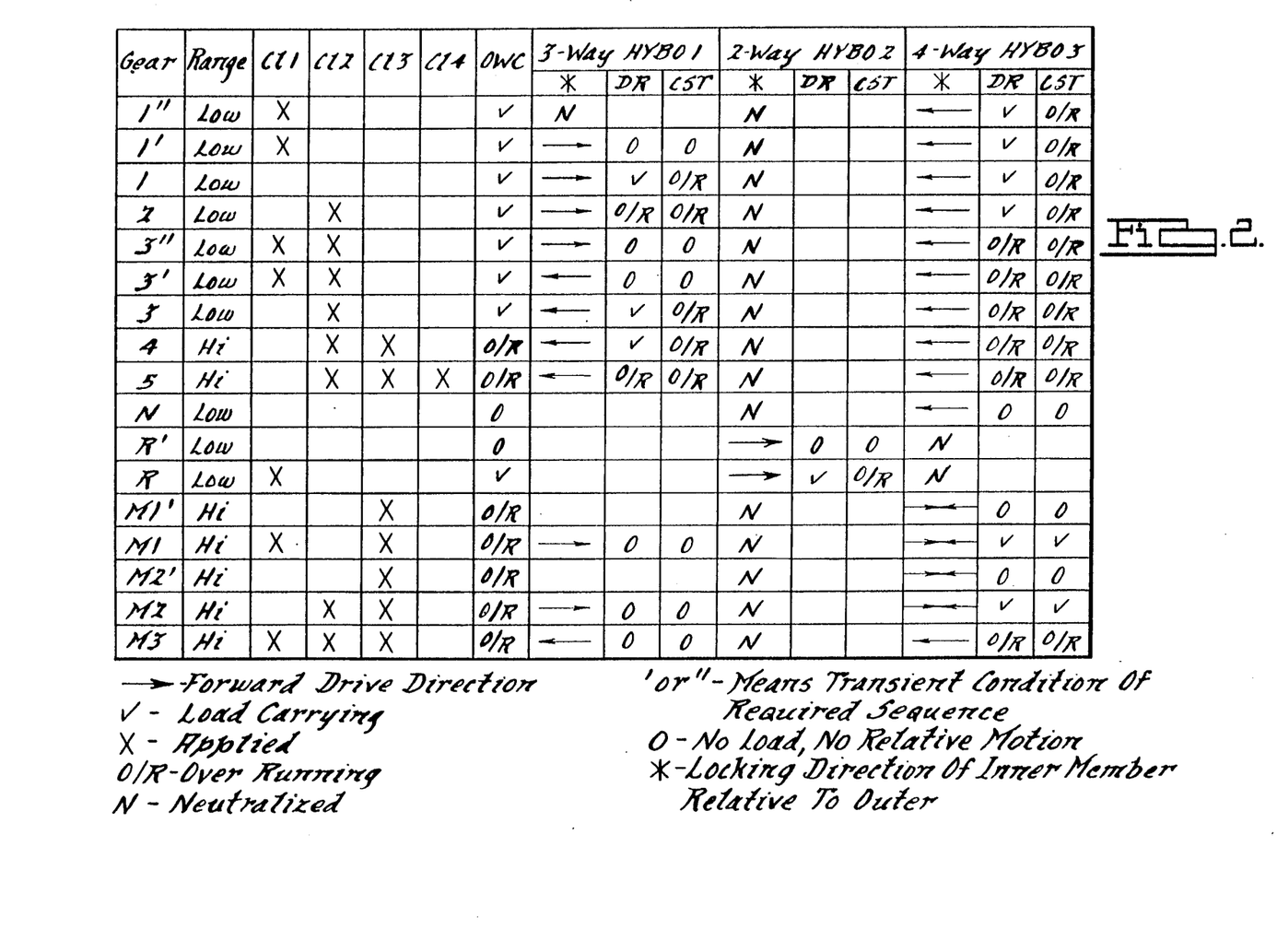
FIG. 2 is a chart that shows the engagement and release pattern for the multiple-function couplings used in the transmission schematically illustrated in FIG. 1.

The table of FIG. 2 summarizes the engagement and release pattern to effect various ratio changes as torque is transferred from the engine to the output shaft.

For the purpose of understanding the operation of the transmission structure schematically shown in FIG. 1, reference will be made to the chart of FIG. 2. In FIG. 2, clutch 70 is identified as clutch CL1, clutch 72 is identified as clutch CL2, clutch 88 is identified as clutch CL3, and brake 62 is identified as clutch CL4. Overrunning coupling 82 is identified in FIG. 2 by the symbol OWC. The clutch 68 is identified in FIG. 2 by the symbol 3-Way Hybo-1. Similarly, the brake 60 is identified by the symbol 2-Way Hybo-2, and brake 58 is identified by the symbol 4-Way Hybo-3. The nomenclature used for the clutches and brakes in FIG. 2 has been applied to the schematic representation of the transmission in FIG. 1 in order to correlate FIG. 1 with FIG. 2.

During operation from a standing start, the engine initially drives the impeller 24, which transfers torque in the usual fashion through the hydrokinetic torque converter 24 to the turbine 26. Turbine shaft 30 then drives gear 76. Torque is transferred through the geared torque transfer drive 76, 78 and 80 and through the overrunning coupling 82 to input shaft 66. As seen in the chart of FIG. 2, the 3-Way Hybo-1 clutch is neutralized. In the next operating step, the 3-Way Hybo-1 clutch is conditioned for torque delivery in a driving direction as indicated by the arrow extending to the right in the line of FIG. 2 identified by the symbol 1'. That symbol is used to designate a transient gear as is the symbol 1" in the preceding step. Although the 3-Way Hybo-1 clutch is conditioned for torque delivery in a driving direction, no torque actually is delivered through it since the race 68 and the shaft 66 are locked together for rotation in unison by the clutch CL1. This avoids a shock or inertia bump upon engagement of the overrunning clutch 3-Way Hybo-1. After the clutch 3-Way Hybo-1 is conditioned for torque delivery, clutch CL1 is released, as indicated in the third step identified in the chart of FIG. 2 as Gear 1. The check mark used in the step identified as Gear 1 indicates that the 3-Way Hybo-1 clutch is in a drive mode. Thus, only the piston 192 is activated, whereas the piston 190 remains inactive.

The brake 58, which is identified as 4-Way Hybo-3, is conditioned for torque delivery in a reverse driving direction as piston 178 is activated. This causes the clutch 4-Way Hybo-3 to become locked in a driving direction, although overrunning motion in a coast direction is permitted as indicated in the first step of FIG. 2 identified as Gear 1". The brake Hybo-3 remains applied through operation of the transmission in the first two ratios, as indicated by the first four steps of FIG. 2, which steps are identified as Gears 1", 1', 1 and 2.

During low-speed ratio operation, with the clutch 3-Way Hybo-1 applied, torque may be transferred through the overrunning coupling OWC to the input shaft 66. Driving torque is then delivered to the sun gear 44. Carrier 46 is connected to ring gear 47 of gear unit 38, thus establishing a compound torque delivery through the gearing as torque is delivered to the output shaft and final drive gear unit 40 as the sun gear 44 drives the carrier 46 and the ring gear 47 drives the carrier 50. The sun gear 48 is anchored by brake Hybo 3.

To effect a ratio change to the second ratio, it merely is necessary to engage clutch CL2. This allows coupling 3-Way Hybo-1 to overrun in both the drive and coast directions, as indicated in FIG. 2 at the step indicated as Gear 2.

The next step in the acceleration sequence illustrated in FIG. 2 is the step indicated by the symbol Gear 3". This occurs as clutch CLI is reapplied. That, in turn, again relieves torque from the clutch Hybo-1. Although the clutch Hybo-1 is still conditioned for a torque delivery in the driving direction as indicated by the arrow extending in a right-hand direction at step Gear 3', the clutch Hybo-1 is conditioned for torque delivery in the opposite direction by releasing piston 192 and applying piston 90. This switch in direction is indicated by a reversal of the arrow. At that time, the clutch 3-Way Hybo-1 still is in a no-load condition since all of the torque at that time is transferred through the clutch CLI as shaft 66 drives the race 68.

After the clutch Hybo 1 is conditioned for torque delivery in the opposite direction, the clutch CL1 again is released so that the clutch 3-way Hybo-1 is active, as indicated by the check mark, and is capable of overrunning in the coast direction but is adapted for torque delivery in the drive direction. CL2 remains applied in third ratio operation as it is during second ratio operation. Thus, all of the elements in the gearing rotate together in unison with a one-to-one ratio.

To achieve a ratio change to the fourth ratio, a gear ratio switch in the geared transfer drive is effected by engaging clutch CL3. This is indicated in the step designated by the symbol Gear 4. This causes overrunning coupling OWC to overrun since the pitch diameter of gear 84 is greater than the pitch diameter of gear 82.

An overdrive condition in the planetary gearing system comprised of gear units 36 and 38 is achieved by engaging reaction brake CL4, thus anchoring the sun gear 44. The clutch Hybo-1 remains conditioned for torque delivery in the driving direction as indicated by the arrow extending in a left-hand direction. Thus, torque is delivered from shaft 66 and through clutch CL2 to the carrier 46 with the sun gear 44 being anchored by the brake CL4, the ring gear 42 and the output shaft are overdriven.

Since the clutch Hybo-1 is preconditioned for torque delivery as indicated at step Gear 4, a downshift can be achieved merely by releasing clutch CL4, which conditions the gearing for four-speed ratio operation. A further downshift to the third ratio from the fourth ratio is achieved merely by releasing the clutch CL3, since the clutch Hybo-1 remains conditioned as before for torque delivery in the driving direction. The neutral state is achieved by releasing or neutralizing all of the clutches and brakes, as indicated in the step Gear N.

The transmission may be conditioned for reverse drive in two stages. The first stage occurs at step Gear R'. This amounts to conditioning the brake Hybo-2 for torque delivery, as indicated by the arrow pointing to the right in step Gear R'. Once the brake Hybo-2 is conditioned for braking action, reverse is achieved by engaging clutch CL1 which transfers torque from the shaft 66 to the sun gear 44. With the carrier 46 acting as a reaction point, the ring gear 42 is driven in a reverse direction which causes the output shaft to drive in a reverse direction.

The last five steps in the chart of FIG. 2 refer to a so-called manual first, manual second and manual third ratio in which the transmission will be conditioned for operation in either the first, the second or the third ratio during driving under torque or during coast braking. Clutch CL3 is applied for each of the manual ratios.

The 4-Way clutch Hybo-3 is conditioned for torque delivery in each direction by simultaneously actuating pistons 182 and 178. The transmission is preconditioned for operation in the manual 1 ratio by engaging clutch CL3. When clutch CLI is applied, torque then is transferred directly to the sun gear 44 from the shaft 66 as the sun gear 48 acts as a reaction member. When it is operating in this mode, the three-way clutch Hybo-1 can be preconditioned for torque delivery as indicated by the directional arrow extending to the right at step Gear Ml. The clutch 3-Way Hybo-1 then would be conditioned for operation. If the transmission again were returned to the automatic low-speed drive range indicated at step Gear 1, second ratio operation would be obtained merely by engaging clutch CL2 with clutch CLI released. With the brake 4-Way Hybo-3 engaged and adapted for torque delivery in either direction, the transmission operates in a coast-braking mode in the second ratio.

Third ratio is achieved by engaging the clutch CLI at the same time that clutch 3-Way Hybo-1 is conditioned for torque delivery in the opposite direction as indicated by the arrow in step Gear M3 extending to the left so that the clutch would be operative if the transmission were to be returned to the automatic drive range 3.

From the foregoing, it is seen that brake Hybo-3 must be released to achieve reverse drive. Until that drive condition occurs, it acts as any conventional one-way clutch during operation in the automatic drive range. In manual low, however, it is required to brake the sun gear 48 in each direction.

It is also apparent from the foregoing description that the clutch Hybo-1 performs the functions of a friction clutch and two independent one-way clutches in a gear system of the kind disclosed in my U.S. Pat. 4,978,328. I have thus substantially simplified the gear system of my earlier design and reduced the overall dimensions of the transmission by eliminating a friction clutch and two one-way clutches.

It is apparent also from the foregoing description that the clutch 3-Way Hybo-1 can be preconditioned during operation in the third ratio for torque delivery prior to a 3-4 upshift. During operation in the second ratio, the direction of torque delivery for which the clutch Hybo-1 is conditioned is not appropriate for a 3-4 upshift. Thus, during operation in the third ratio, the clutch 3-Way Hybo-1 is preconditioned for a 3-4 upshift. The direction of the arrow for 3-Way Hybo-1 is changed at step Gear 3', thus pre-staging the clutch for a nonsynchronous 3-4 upshift.

Having described a preferred embodiment of my invention, what I claim and desire to secure by United States Letters Patent is:

1. A planetary gear transmission adapted to deliver torque from an engine crankshaft to a driven member and vehicle traction wheels, said transmission having multiple gear elements on a common axis that are adapted to establish plural torque flow paths with discrete torque ratios;

clutch means and brake means for selectively braking said gear elements and for drivably connecting said gear elements, one of said brake means comprising a releasable, bi-directional overrunning coupling comprising two concentric coupling races, each race having independent clutch surfaces of revolution;

a point on each surface of revolution adjacent an axial side of each race being of smaller diameter relative to a point on said race intermediate its axial sides, one of said races being bipartite with one of its surfaces of revolution being formed on one part thereof and the other of its surfaces of revolution being formed on the other part thereof; and means for selectively adjusting each part relative to the other of said races whereby said one brake means is adapted for freewheeling relative motion of said races in each direction, for freewheeling relative motion in one direction only, for freewheeling relative motion in the opposite direction, for locking said races together for torque transfer in one direction, for torque transfer in the opposite direction, and for torque transfer in both directions.

2. The combination as forth in claim 1 wherein said multiple gear elements comprise two sets of simple planetary gear units, each gear unit having a ring gear, a sun gear, a carrier and planet pinion carried by said carrier in meshing engagement with said sun and ring gears, the ring gear of a first of said gear units and the carrier of a second of said gear units being connected to said driven member, the carrier of said first gear unit being connected to the ring gear of said second gear unit;

said one brake means being connected to the sun gear of said second gear unit.

3. The combination as set forth in claim 2 wherein said brake means comprises a releasable, bidirectional brake having concentric races, each race having a braking surface of revolution with axial ends of different diameters, one of said concentric races being connected to the carrier of said first gear unit and to the ring gear of said second gear unit, the other of said concentric races being anchored to a stationary portion of said transmission; and means for adjusting axially said outer race relative to said inner race whereby said carrier may be braked in one direction only or adapted for freewheeling relative motion in each direction.

4. The combination as set forth in claim 3 wherein said adjusting means comprises an annular cylinder connected to said stationary portion, an annular piston in said annular piston and defining therewith a servo pressure chamber, spring means for applying an axial force to said outer race and means for transferring pressure forces from said annular piston to said outer race to oppose the force of said spring means.

5. The combination as set forth in claim 1 whereby said means for adjusting each point of said one race comprises an annular cylinder connected to a stationary portion of said transmission, an annular piston in said annular cylinder defining therewith a servo pressure chamber, spring means for applying an axial force to said outer race and means for transferring pressure forces from said annular piston to said outer race to oppose the force of said spring means.

6. An automatic transmission having a driving shaft, a driven shaft and multiple gear elements, clutch means and brake means for selectively braking said gear elements and for drivably connecting said gear elements, one of said clutch means comprising a releasable, bi-directional overrunning coupling comprising two concentric coupling races;

each race having independent clutch surfaces of revolution with a maximum radius intermediate axial side thereof, one of said races being bipartite with one of its surfaces of revolution being formed on one part thereof and the other of its surfaces of revolution being formed on the other part thereof; and means for selectively adjusting each part relative to the other of said races whereby said one clutch means is adapted for freewheeling relative motion of said races in each direction, for freewheeling relative motion in one direction only, for freewheeling relative motion in the opposite direction, for locking said races together for torque transfer in one direction, for torque transfer in the opposite direction, and for torque transfer in both directions.

7. The combination as set forth in claim 6 wherein said multiple gear elements comprising two sets of simple planetary gear units, each gear unit having a ring gear, a sun gear, a carrier and planet pinion carried by said carrier in meshing engagement with said sun and ring gears, the ring gear of a first of said gear units and the carrier of a second of said gear units being connected to said driven member, the carrier of said first gear unit being connected to the ring gear of said second gear unit;

one of said brake means being connected to the sun gear of said second gear unit.

8. An automatic transmission having a driving shaft, a driven shaft and multiple gear elements, clutch means and brake means for selectively braking said gear elements and for drivably connecting said gear elements, one of said clutch means comprising a releasable, bi-directional overrunning coupling comprising two concentric coupling races, each race having independent clutch surfaces of revolution with a maximum radius intermediate axial side thereof;

one of said races being bipartite with one of its surfaces of revolution being formed on one part thereof and the other of its surfaces of revolution being formed on the other part thereof; and means for selectively adjusting each part relative to the other of said races whereby said one clutch means is adapted for freewheeling relative motion of said races in each direction, for freewheeling relative motion in one direction only, for freewheeling relative motion in the opposite direction, for locking said races together for torque transfer in one direction, for torque transfer in the opposite direction, and for torque transfer in both directions;

a first friction clutch means for connecting one of said races to said driving shaft thereby providing a parallel torque flow path around said one releasable, bi-directional coupling.

9. The combination as set forth in claim 8 wherein said multiple gear elements comprise two sets of simple planetary gear units, each gear unit having a ring gear, a sun gear, a carrier and planet pinions carried by said carrier in meshing engagement with said sun and ring gears, the ring gear of a first of said gear units and the carrier of a second of said gear units being connected to said driven member, the carrier of said first gear unit being connected to the ring gear of said second gear unit;

one of said brake means being connected to the sun gear of said second gear unit.

10. An automatic transmission having a driving shaft, a driven shaft and multiple gear elements, clutch means and brake means for selectively braking said gear elements and for drivably connecting said gear elements, one of said clutch means comprising a releasable, bi-directional overrunning coupling comprising two concentric coupling races, each race having independent clutch surfaces of revolution with a maximum radius intermediate the axial sides thereof;

one of said races being bipartite with one of its surfaces of revolution being formed on one part thereof and the other of its surfaces of revolution being formed on the other part thereof; and means for selectively adjusting each part relative to the other of said races whereby said one clutch means is adapted for freewheeling relative motion of said races in each direction, for freewheeling relative motion in one direction only, for freewheeling relative motion in the opposite direction, for locking said races together for torque transfer in one direction, for torque transfer in the opposite direction, and for torque transfer in both directions;

a first friction clutch means for connecting one of said races to said driving shaft thereby providing a parallel torque flow path around said one releasable, bi-directional coupling;

said one race being connected to a first torque input element of said multiple-gear elements and second friction clutch means for connecting said driving shaft to a second torque input element of said multiple-gear elements.

11. The combination as set forth in claim 10 wherein said multiple gear elements comprises two sets of simple planetary gear units, each gear unit having a ring gear, a sun gear, a carrier and planet pinion carried by said carrier in meshing engagement with said sun and ring gears, the ring gear of a first of said gear units and the carrier of a second of said gear units being connected to said driven member, the carrier of said first gear unit being connected to the ring gear of said second gear unit;

one of said brake means being connected to the sun gear of said second gear unit.

* * * * *

UNITED STATES PATENT AND TRADEMARK OFFICE
CERTIFICATE OF CORRECTION

PATENT NO. : 5,129,870

DATED : July 14, 1992

INVENTOR(S) : Stanley L. Pierce

It is certified that error appears in the above-identified patent and that said Letters Patent is hereby corrected as shown below:

| | | |
|---|---|---|
| ol. 3, | Line 51, | Delete "spring" and insert --during-- |
| ol. 3, | Line 63, | Delete "co" and insert --control--; |
| ol. 3, | Line 65, | After "Fig. 6" insert --is a--; |
| ol. 6, | Line 56, | After "carrier" delete --!!2-- and insert --112--; |
| ol. 8, | Line 24, | Delete "!68" and insert --168--; |
| ol. 8, | Line 25, | Delete "!64" and insert --164--; |
| ol. 8, | Line 28, | Delete "!72" and insert --172--; |
| ol. 9, | Line 50, | Delete "CLI" and insert --CL1--; |
| ol. 9, | Line 57, | Delete "90" and insert --190--; |
| ol. 9, | Line 61, | Delete "CLI" and insert --CL1--; |
| ol. 10, | Line 50, | Delete "CLI" and insert --CL1--; |
| ol. 10, | Line 61, | Delete "CLI" and insert --CL1--; |
| ol. 10, | Line 65, | Delete "CLI" and insert --CL1--; |
| ol. 11, | Line 61, | After "as" insert --set--. |

UNITED STATES PATENT AND TRADEMARK OFFICE
CERTIFICATE OF CORRECTION

PATENT NO. : 5,129,870

DATED : July 14, 1992

INVENTOR(S) : Stanley L. Pierce

It is certified that error appears in the above-indentified patent and that said Letters Patent is hereby corrected as shown below:

Col. 11, Line 61,   After "as" insert --set--.

Signed and Sealed this

Seventh Day of September, 1993

*Attest:*

BRUCE LEHMAN

*Attesting Officer*     *Commissioner of Patents and Trademarks*